(12) United States Patent
Kageyama et al.

(10) Patent No.: US 6,613,295 B1
(45) Date of Patent: Sep. 2, 2003

(54) CARRIER SUPPORTING MAT FOR EXHAUST CONVERTER

(75) Inventors: Yasushi Kageyama, Hamamatsu (JP); Sadaaki Ohashi, Hamamatsu (JP); Shuichi Nishizaki, Hamamatsu (JP); Kozo Suganuma, Hamamatsu (JP); Shinichi Tosa, Wako (JP)

(73) Assignees: Kabushiki Kaisha Yutaka Giken, Shizuoka-ken (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/448,450

(22) Filed: Nov. 24, 1999

(30) Foreign Application Priority Data

Nov. 24, 1998 (JP) .......................................... 10-332872

(51) Int. Cl.[7] ........................ B01D 50/00; B01D 53/34; B01J 21/04
(52) U.S. Cl. ...................... 422/179; 422/180; 422/181; 502/527.11; 502/527.12; 502/527.13
(58) Field of Search ................................ 422/179, 180, 422/181; 502/527.11, 527.12, 527.13; 428/68, 75, 76, 77

(56) References Cited

U.S. PATENT DOCUMENTS

| | | | | | |
|---|---|---|---|---|---|
| 4,048,363 | A | * | 9/1977 | Langer et al. | 428/77 |
| 4,093,423 | A | * | 6/1978 | Neumann | 29/890 |
| 5,293,743 | A | * | 3/1994 | Usleman et al. | 60/299 |
| 5,332,609 | A | * | 7/1994 | Corn | 428/77 |
| 6,101,714 | A | * | 8/2000 | Schmitt | 29/890 |

* cited by examiner

Primary Examiner—Glenn Caldarola
Assistant Examiner—Douglas W Rudnick
(74) Attorney, Agent, or Firm—Townsend & Banta

(57) ABSTRACT

A carrier supporting mat for exhaust converter for supporting a catalyst carrier is structured in having heat insulating mat members on an inner side as to direct contact with the catalyst carrier, an expansible mat member including a vermiculite on an outer side of the heat insulating mat members, and at least one heat insulating sheet member disposed among the mat members. Heats from exhaust gas is cut off by the heat insulating mat members, and expansion of a metal casing of the exhaust converter due to heats is followed by the expansible mat member. The sheet member creates sliding when the carrier supporting mat is lapped on the catalyst carrier because the mat members and sheet member can move correlatively and smoothly, thereby preventing wrinkles and tears from occurring.

10 Claims, 5 Drawing Sheets

(a)

(b)

(a)

(b)

(a)

(b)

(a)

(b)

(a)

(b)

CARRIER SUPPORTING MAT FOR EXHAUST CONVERTER

BACKGROUND OF THE INVENTION

1. Field of the Invention

This invention relates to a carrier supporting mat lapped around an outer peripheral surface of a catalyst carrier and disposed within a metal casing where an exhaust converter contains the catalyst carrier in the metal casing.

2. Description of Related Art

Exhaust converter is generally made by containing a cylindrical catalyst carrier within a metal casing. Such a catalyst carrier is generally made of a ceramic or metal. The catalyst carrier is generally held not in direct contact with the casing, and a supporting material is lapped around an outer periphery of the catalyst carrier and placed between the casing and the catalyst carrier.

High temperature gas from an engine flows into the exhaust converter, and the exhaust gas is purified by passing through the catalyst carrier. It is preferable to set the exhaust gas at a high temperature to maintain the efficiency of the catalyst in a good state. Therefore, the supporting material having good heat insulating property is lapped around the outer periphery of the catalyst carrier and placed between the casing and the catalyst carrier, so that the exhaust converter is structured to be capable of maintaining the temperature of the exhaust gas.

However, it is impossible to completely isolate the heat of the exhaust gas from the casing, and therefore, the converter cannot stop increasing of the temperature of the casing and renders the casing expand due to increased temperature of the casing. Since the thermal expansion coefficient of the casing is larger than the thermal expansion coefficient of the catalyst carrier, there raises a problem that contact portions between the catalyst carrier and the casing become rickety.

For example, in Japanese Unexamined Patent Publication No. Heisei 7-4,234, an art has been disclosed in which a catalyst carrier is supported in cutting two foamed sheets containing ammonium-ion-processed vermiculite inorganic fiber material, and binder with a thickness of 4.9 mm into rectangular parts having grooves and tongue pieces. With this art, the foamed sheets can be kept away from receiving tears and wrinkles.

In Japanese Unexamined Patent Publication No. Heisei 3-3,915, disclosed is a foamed antiflaming attachment pad made of a foamed antiflaming sheet material of at least two layers adhered to each other and offset in a prescribed amount in a longitudinal direction. With this technology, no tear or crush occurs when the pad is lapped around a fragile structure.

To hold the catalyst carrier in following the expansion and contraction of the metal casing due to heats, a thermally expandable mat is used in any method. Particularly, the recent trend is to use the catalyst carrier at a higher temperature.

A conventional expandable mat including vermiculite cannot be said as having high heat resistance and can be easily impaired. A special processing is therefore required, resulting in that the mat becomes expensive. In addition, the catalyst carrier may be broken due to uneven exertion of areal pressure when the catalyst carrier lapped with such a mat is assembled to the metal casing. Particularly, because the expansion mat including the vermiculite is hard, there raises a problem that binding load may not be so large to hold directly the catalyst carrier having fine cells.

As shown in FIG. 5, a supporting member 51 is formed with a thickness corresponding to a diameter of a catalyst carrier 52 and a size of a casing not shown. When the supporting member 51 is lapped around the outer periphery of the catalyst carrier 52, wrinkles 51a may occur on a contact surface of the catalyst carrier 52 from peripheral length differences between the surface on a side of the catalyst carrier 52 and the surface on an outer side, and also tears 51b may occur on the outer surface. Where such wrinkles 51a and tears 51b occur, there raises a problem to cause breakdown due to uneven exertion of loads to the catalyst carrier 52 when contained in the casing.

The technologies disclosed in the respective Patent Publications cannot solve the above problems. That is, though parts of the respective mats are adhered to create sliding between the respective layers when the mats are lapped around the catalyst carrier, the respective mats have large undulations, so that it is difficult to slide the mats having large friction coefficient.

As described above, where the mats formed in a multilayer form are directly in contact with the catalyst carrier, there raises a problem that the respective portions are not easily separated from each other when the catalyst carrier, the mats, and the like are required to be recycled.

It is an object of the invention to provide a carrier supporting mat for exhaust converter having high heat isolation property and good heat expansion characteristics, not subjecting to wrinkles or tears when lapped around a catalyst carrier.

SUMMARY OF THE INVENTION

To accomplish the above problem, according to the invention, a carrier supporting mat for exhaust converter, which includes a metal casing and a catalyst carrier disposed within the metal casing, to position the catalyst carrier in the metal casing upon lapped around the catalyst carrier, includes a multilayer structure having: a highly heat insulating mat member disposed on an inner side; and an expansible mat member containing a vermiculite material disposed on an outer side, and at least one sheet member placed between the respective mat members.

With the carrier supporting mat for exhaust converter, the expansible mat member containing the vermiculite is expanded and contracted according to changes of the temperature of the expansible mat member. Therefore, when the exhaust gas heated at a high temperature flows into the exhaust converter, the highly heat insulating mat member disposed on the inner side insulates the catalyst carrier from the heat. With respect to the thermal expansion of the metal casing, a gap formed between the metal casing and the catalyst carrier can be stuffed by expansion of the expansible mat member containing the vermiculite material disposed on the outer side.

Placement of the sheet member between the respective mat members particularly realizes good sliding among the mat members when the carrier supporting mat is overlapped around the catalyst carrier, thereby allowing the respective mat members to move easily. This can therefore prevent the carrier supporting mat from subjecting to wrinkles or tears. Placement of the mat members also enforces the carrier supporting mat otherwise relatively fragile and easily torn, so that the carrier supporting mat can be overlapped on the catalyst carrier with larger winding force, and so that the highly heat insulating mat member and the expansible mat member, which constitute the carrier supporting mat, can be made thinner.

In the carrier supporting mat, the sheet member is preferably made of a heat resistance sheet. Where the sheet member has a heat resistance property, the respective mat members remain separated by the sheet member as a boundary even though used for a long period, and therefore, when required to be recycled, the catalyst carrier and the highly heat insulating mat member and the expansible mat member, which constitute the carrier supporting mat, can be separated easily.

With the carrier supporting mat, it is preferable to set the thickness of the highly heat insulating mat member disposed on the inner side is made thicker than the thickness of the expansible mat member containing the vermiculite material disposed on the outer side. The carrier supporting mat thus constructed can make the thicknesses of the respective mat members thinner than those of the conventional supporting materials. Therefore, when overlapped around the outer periphery of the catalyst carrier, no wrinkle or tear occurs because the respective mat members have thinner thicknesses.

With the carrier supporting mat, it is preferable to set the length of the highly heat insulating mat member disposed on the inner side is made shorter than the length of the expansible mat member containing the vermiculite material disposed on the outer side, and also, it is preferable to set the highly heat insulating mat member disposed on the inner side and the expansible mat member containing the vermiculite material disposed on the outer side are positionally shifted to one another in an outer peripheral surface direction and adhered at the overlapped portion to one another by the sheet member.

The carrier supporting mat thus structured can be lapped on the catalyst carrier without exposing the outer periphery of the catalyst carrier. A stable lapping state can be realized without positionally shifting of the respective mat members when lapped around the catalyst carrier by adhering the overlapped portions of the highly heat insulating mat member and the expansible mat member to each other by the sheet member. The mat members readily slide along the sheet member disposed between the mat members with respect to the adhered portion as an original point and move relatively, so that assembling efficiency can be improved where no mat member moves independently. Such adhering means losses griping force when heated at a high temperature, so that the carrier supporting mat can be recycled without any adverse effect from the adhered structure.

With the carrier supporting mat, it is preferable to set the highly heat insulating mat member disposed on the inner side and the expansible mat member disposed on the outer side are adhered at an end of the respective mat members in a longitudinal direction of the mat members. The carrier supporting mat thus structured can lap the highly heat insulating mat almost completely around the outer periphery of the carrier.

BRIEF DESCRIPTION OF THE DRAWINGS

The above and other objects and features of the invention are apparent to those skilled in the art from the following preferred embodiments thereof when considered in conjunction with the accompanied drawings, in which.

DETAILED DESCRIPTION OF THE PREFERRED EMBODIMENTS

Figure 1:
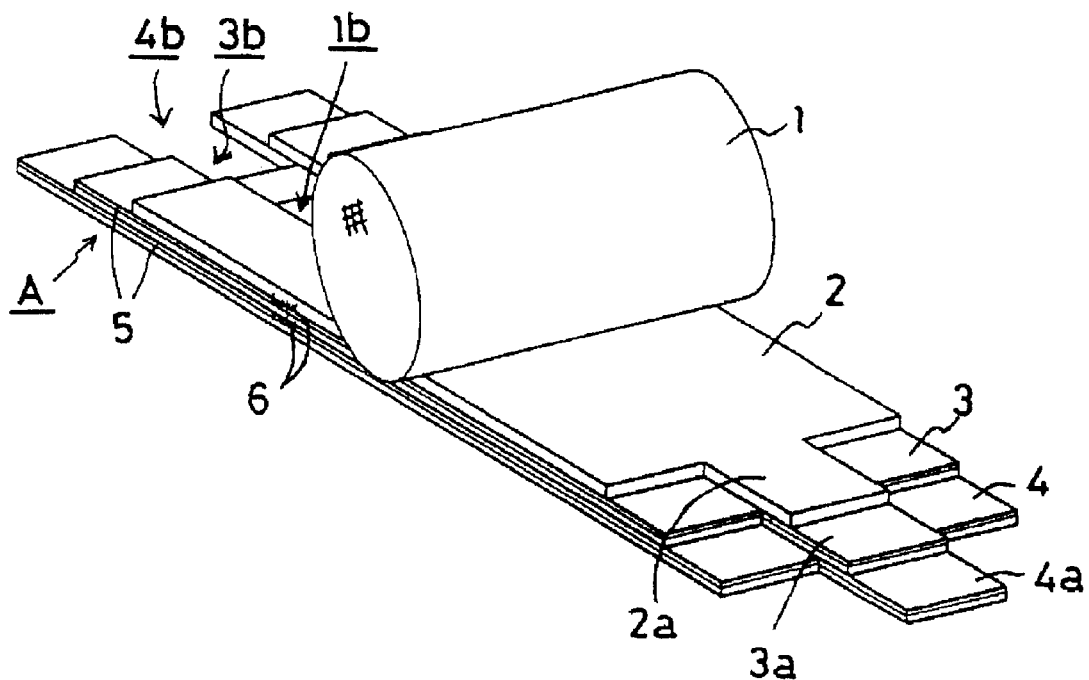
FIGS. 1(*a*), 1(*b*) are perspective illustrations showing a carrier supporting mat according to a first embodiment and a catalyst carrier on which the carrier supporting mat is lapped.
Figure 1:
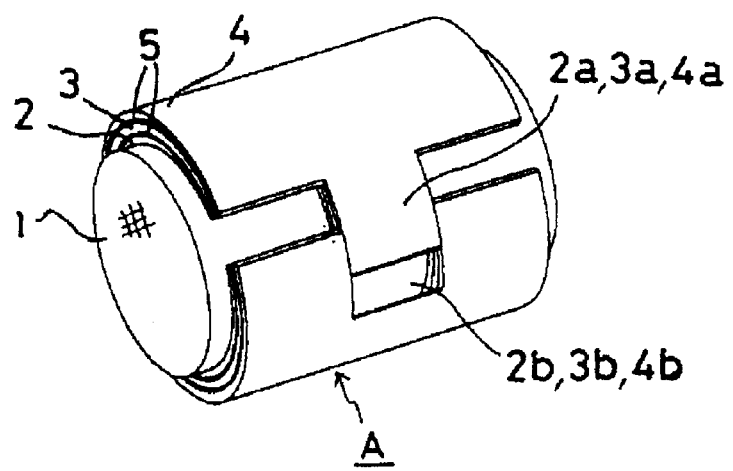

Hereinafter, referring to FIGS. 1 to 4, carrier supporting mats according to preferred embodiments of the invention are described. First, the structure of the carrier supporting mat A according to the first embodiment, shown in FIGS. 1(*a*), 1(*b*), is described. FIG. 1(*a*) shows a state that the carrier supporting mat A is extended and a relation between the carrier supporting mat A and the catalyst carrier 1, and FIG. 1(*b*) shows a state that the carrier supporting mat A is lapped on the outer periphery of the catalyst carrier 1.

In this embodiment, the carrier supporting mat A includes a first heat insulating mat member 2 in direct contact with an outer periphery of the catalyst carrier 1, a second heat insulating mat member 3 disposed on an outer side of the first heat insulating mat member 2, an expansible mat member 4 disposed further on an outer side of the second mat member 3, and a sheet member 5 disposed between the respective mat members consisted of the heat insulating mat members 2, 3 and the expansible mat member 4. The carrier supporting mat A is structured in a state that the heat insulating mat members 2, 3, the expansible mat member 4, and the sheet member 5 are overlapped with each other.

The first heat insulating mat member 2 and the second heat insulating mat member 3 have the same thickness, and the total thickness of the overlapped heat insulating mat members 2, 3 is set thicker than the thickness of the expansible mat member 4. The lengths of the first heat insulating mat member 2, the second heat insulating mat member 3, and the expansible mat member 4 are set longer in the order from the first heat insulating mat member 2 disposed on the inner side to the expansible mat member 4 disposed on the outmost side, and the respective lengths can adjust peripheral length differences when lapped on the outer periphery on the catalyst carrier 1.

One end of each of the first heat insulating mat member 2, the second heat insulating mat member 3, and the expansible mat member 4 (in a direction corresponding to the outer periphery of the catalyst carrier 1) is formed with a corresponding engagement projection 2*a* to 4*a*, and the other end is formed with an engagement recess 2*a* to 4*a* to be engaged with the corresponding engagement projection 2*b* to 4*b*. The whole length of the first heat insulating mat member 2 including the engagement projection 2*a* is longer than the outer peripheral length of the catalyst carrier 1, and the length of the first heat insulating mat member 2 excepting the engagement projection 2*a* is shorter than the outer peripheral length of the catalyst carrier 1. Therefore, when the first heat insulating mat member 2 is lapped around the outer periphery of the catalyst carrier 1, the engagement projection 2*a* engages with the engagement recess 2*b*, so that no portion extending straight in an axial direction on the outer periphery of the catalyst carrier 1 is exposed though an arc portion on the outer periphery of the catalyst carrier 1 is partially exposed. The second heat insulating mat member 3 and the expansible mat member 4 are formed with substantially the same size relation.

The sheet member 5 is formed in the identical shape to the outer peripheral shapes of the mat members (namely, the first heat insulating mat member 2, and the second heat insulating mat member 3) or to the inner peripheral shapes of the mat members (namely, the second heat insulating 3, and the expansible mat member 4), and the sheet member 5 is so formed as to be handled in the same manner as the mat members having the corresponding shapes.

The carrier supporting mat A is formed with an adhering portion 6 at which sides of the members 2, 3, 4, 5 are overlapped after the first heat insulating mat member 2, the sheet member 5, the second heat insulating mat member 3, the sheet member 5, and the expansible mat member 4 are overlapped with each other, and thereby, the three mat members and two sheet members are made in a united body. Since the three mat members 2, 3, 4, overlapped with each other, are adhered to form a united body, the overlapped three mat members 2, 3, 4 when lapped on the catalyst carrier 1 can easily slide to move correlatively with respect to the adhering portion 6 as a starting point along the sheet members 5 disposed among the mat members 2, 3, 4, and therefore, the mat members 2, 3, 4 may not move independently, and assembling workability can be improved.

Because the carrier supporting mat A is formed as a multilayer structure of the first heat insulating mat member 2, the second heat insulating mat member 3, and the expansible mat member 4 and because the sheet members 5 are placed between the respective mat members 2, 3, 4, the thickness of each mat member 2, 3, 4 can be made thinner, and the mat members 2 to 4 can prevent wrinkles on an inner peripheral surface from occurring by creating sliding between the mat members when lapped on the catalyst carrier 1, as well as can prevent tears from occurring on the outer peripheral surface. Therefore, it is possible to hold the catalyst carrier upon creating uniform surface pressure in exerting force approximately equally to the outer peripheral surface of the catalyst carrier 1.

The first and second heat insulating mat members 2, 3 are made of a material having highly insulating property, and the material may not be expected to have the expansibility. As such a material, exemplified are highly insulating mat members made of an alumina fiber and highly insulating mat members made of a high alumina fiber and a silica fiber. Those highly insulating mat members may not lose supporting force even where heated at a temperature of 950° C. or higher. The heat insulating mat members 2, 3 are not limited to those having the above materials, and any material can be use as far as having heat insulating property of about 950° C. or 1,000° C.

The material having the alumna fiber as the essential fiber, particularly, is adequately soft, and the material is suitable to support the catalyst carrier 1 upon directly contacting with the catalyst carrier 1. It is very effective to hold the catalyst carrier 1 having a thinner wall thickness with proper surface pressure.

The expansible mat member 4 is made of a material containing a vermiculite that expands and contracts according to the changing temperature. As such a material, exemplified are Intaramu (goods name). This material allows the vermiculite contained in the fiber materials to expand and contract according to the changes of the temperature, and when the exhaust converter is used, the expansible mat member 4 can follow the expansion of the metal casing constituting the exhaust converter according to increase of the temperature of the metal casing.

The sheet member 5 is made of a material having heat insulating property and proper lubricating property, and is formed in a sheet shape including a film shape. As such a material, exemplified are sheets using alumna materials such as Rubiron (trademark) or FineFlex (goods name).

The carrier supporting mat A thus constituted can support the outer periphery of the catalyst carrier 1 with the first heat insulating mat member 2 and the second heat insulating mat member 3, which have high insulating property, and can operate with different elasticities according to the respective material characteristics by supporting the outer sides of the first heat insulating mat member 2 and the second heat insulating mat member 3 with the expansible mat member 4. Therefore, the catalyst carrier 1 can be stably supported from the effects of the so-called hybrid spring.

Figure 2:
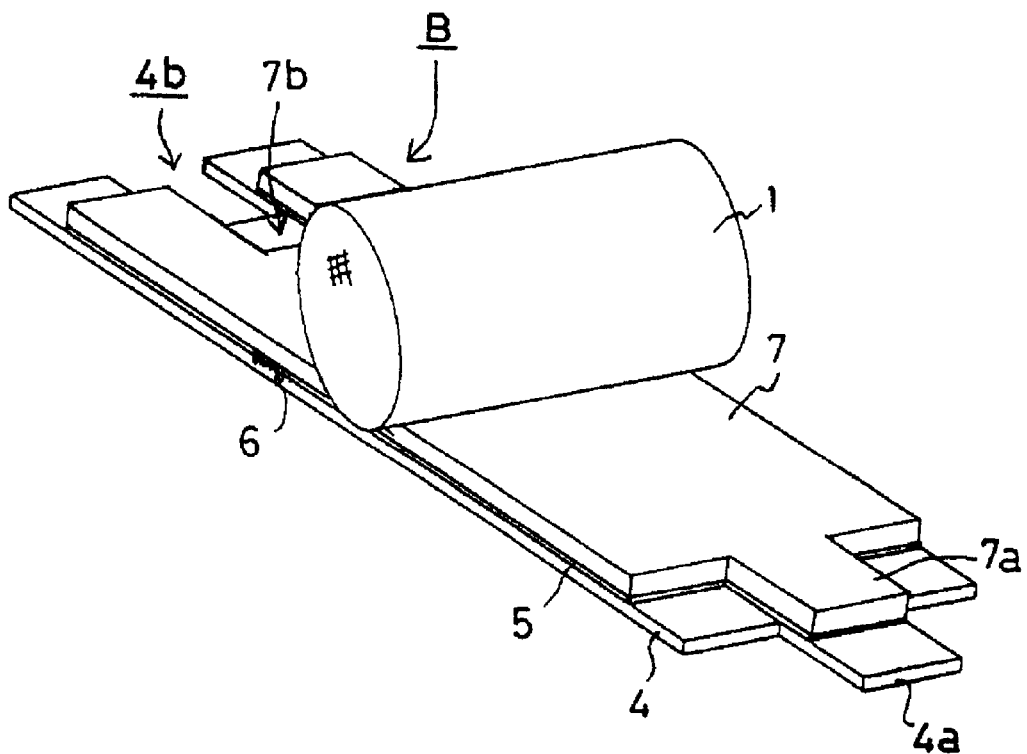
FIGS. 2(*a*), 2(*b*) are perspective illustrations showing a carrier supporting mat according to a second embodiment and a catalyst carrier on which the carrier supporting mat is lapped.
Figure 2:
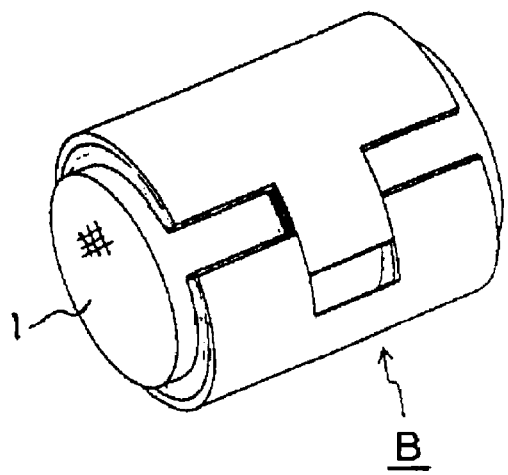

FIG. 2 illustrates the structure of the carrier supporting mat B according to the second embodiment and a state supporting the catalyst carrier 1 with the carrier supporting mat B. The explanation of portions having substantially the same portions and functions as those in the above embodiment is omitted by using the same reference numbers.

The carrier supporting mat B according to this embodiment has one sheet of a heat insulating mat member 7 in direct contact with the catalyst carrier 1 as shown in FIG. 2. Accordingly, the heat insulating mat member 7 has approximately the same thickness as the total thickness of the first heat insulating mat member 2 and the second heat insulating mat member 3, and the thickness of the heat insulating mat member 7 is thicker than the thickness of the expansible mat member 4. An engagement projection 7a is formed on one end of the heat insulating mat member 7, and an engagement recess 7b is formed on the other end of the heat insulating mat member 7.

The heat insulating mat member 7 is disposed on a side in contact with the catalyst carrier 1 (inner side), while the expansible mat member 4 is disposed on an outer side of the expansible mat member 7. An adhering portion 6 is formed at a prescribed portion on the respective sides to maintain the positional relation between the respective sides of the member.

The carrier supporting mat B thus structured does not create any large wrinkle on an inner side of the heat insulating mat member 7 when lapped on the catalyst carrier 1 and does not produce any tear on an outer side. Therefore, the carrier supporting mat B can stably support the catalyst carrier 1 without exerting any uneven surface pressure on the catalyst carrier 1.

Figure 3:
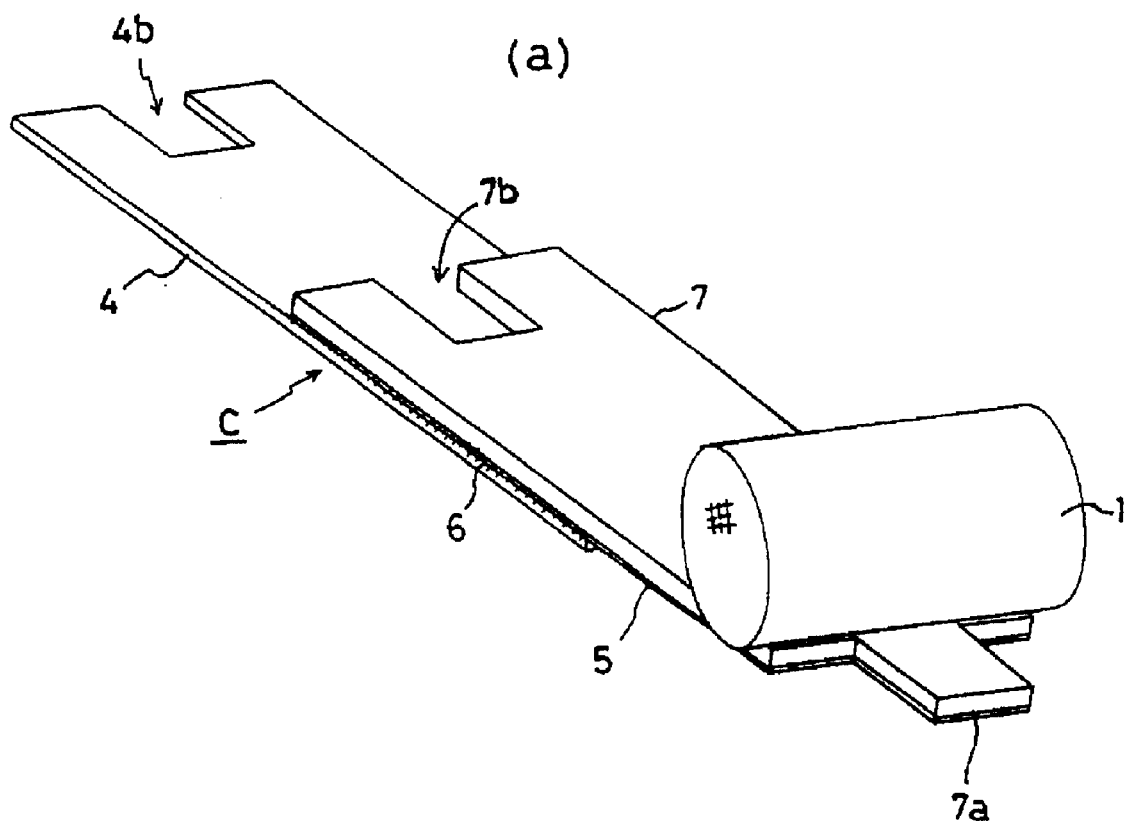
FIGS. 3(*a*), 3(*b*) are perspective illustrations showing a carrier supporting mat according to a third embodiment and a catalyst carrier on which the carrier supporting mat is lapped.
Figure 3:
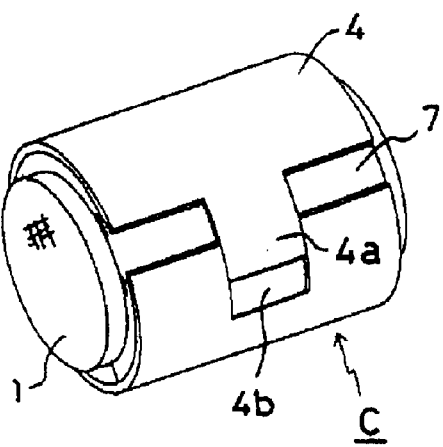

FIG. 3 illustrates the structure of the carrier supporting mat C according to the third embodiment and a state supporting the catalyst carrier 1 with the carrier supporting mat C. The explanation of portions having substantially the same portions and functions as those in the above embodiments is omitted by using the same reference numbers.

The carrier supporting mat C is made in a united body of the heat insulating mat member 7 and the expansible mat member 4 by forming an adhering portion 6 on the respective sides as positionally shifted in the longitudinal direction of the mat members 7, 4.

With the carrier supporting mat C thus structured, when lapped on the catalyst carrier 1, the carrier supporting mat C can shift the positions of the joint of the heat insulating mat member 7 (engagement portion between the engagement projection 7a and the engagement recess 7b) and the joint of the expansible mat member 4 (engagement portion between the engagement projection 4a and the engagement recess 4b), so that the carrier supporting mat C can further make even the surface pressure to the catalyst carrier 1. Therefore, it is possible to support the catalyst carrier 1 under a very stable state.

Figure 4:
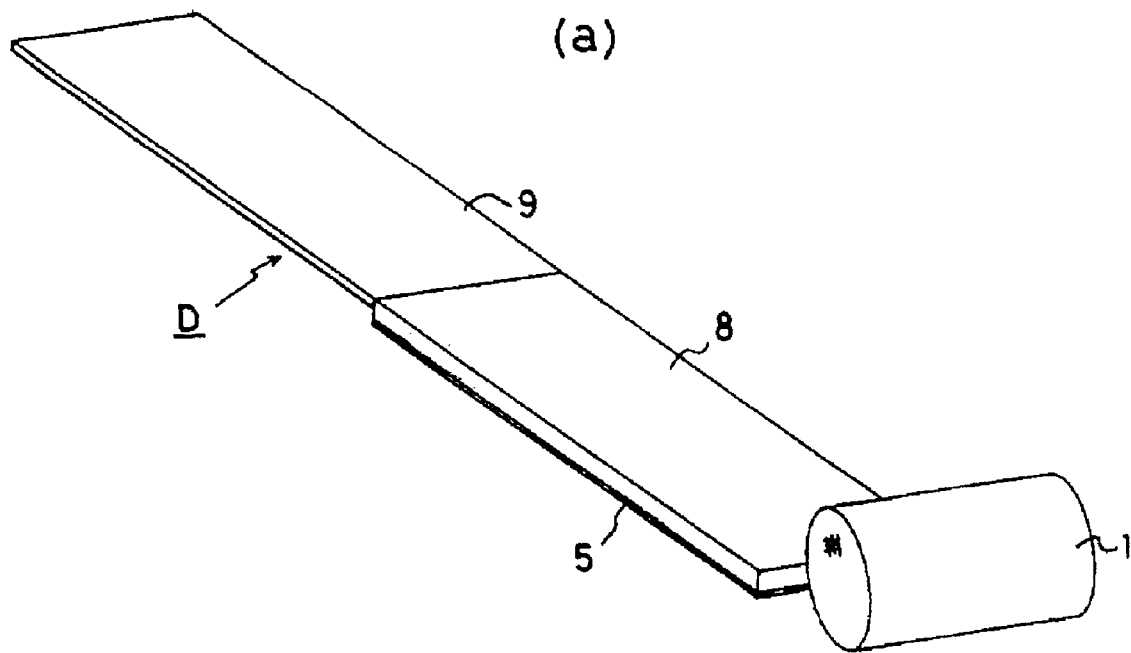
FIGS. 4(*a*), 4(*b*) are perspective illustrations showing a carrier supporting mat according to a fourth embodiment and a catalyst carrier on which the carrier supporting mat is lapped.
Figure 4:
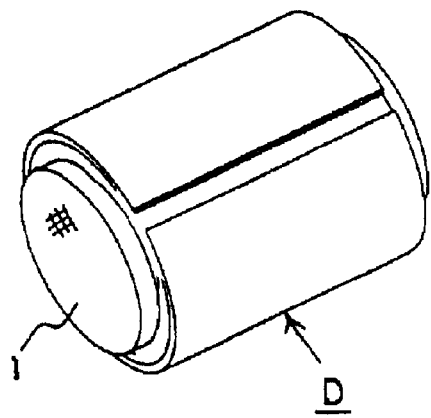
Figure 5:
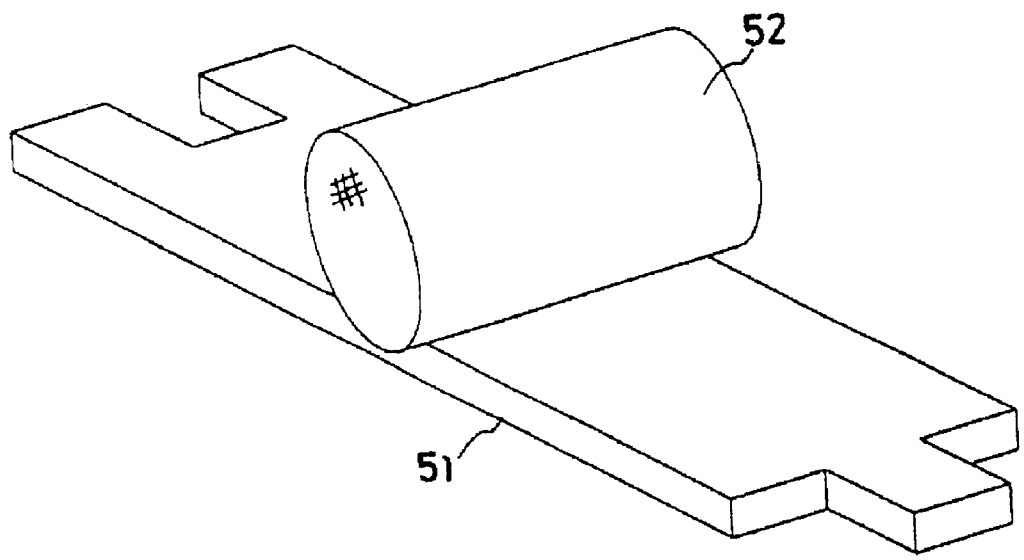
FIGS. 5(*a*), 5(*b*) are perspective illustrations showing problems in a conventional carrier supporting mat.
Figure 5:
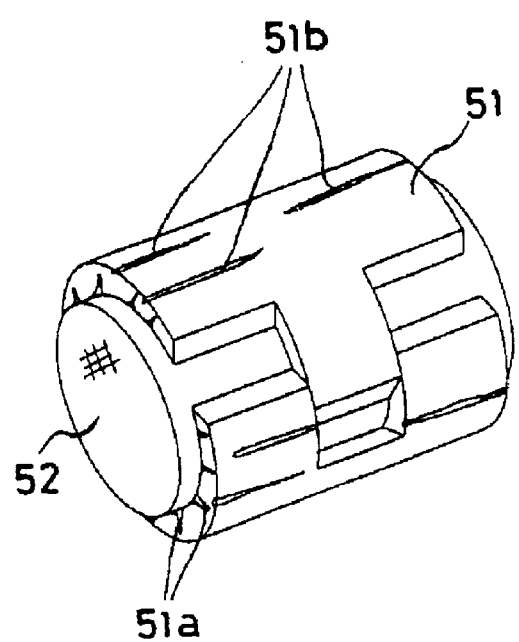

FIG. 4 illustrates the structure of the carrier supporting mat D according to the third embodiment and a state supporting the catalyst carrier 1 with the carrier supporting mat D. The explanation of portions having substantially the same portions and functions as those in the above embodiments is omitted by using the same reference numbers.

The carrier supporting mat D according to this embodiment is made by adhering the respective ends of a heat insulating mat member 8 formed in a plate shape and an expansible mat member 9 formed similarly in a plate shape in placing the mat member 8, 9 in series. The sheet member 5 is disposed on an outer side of the heat insulating mat member 8.

The carrier supporting mat D thus structured can make even the surface pressure where the heat insulating mat member 8 and the expansible mat member 9 become continuous when lapped on the catalyst carrier 1. Therefore, the carrier supporting mat D can support the catalyst carrier 1 under a very stable state.

As described above, the carrier supporting mat according to the invention can protect the expansible mat member from subjecting to heats by high heat insulating performance of the heat insulating mat member, and non-expansibility of the heat insulating mat member can be maintained by the expansible mat member, where the heat insulating mat member is disposed as to directly contact with the catalyst carrier and where the expansible mat member including the vermiculite is disposed on the outer side of the heat insulating mat member. Therefore, the temperature of the exhaust gas to be communicate through the exhaust converter can be of a high temperature, and the purification efficiency can be improved. In addition, when the metal casing of the exhaust converter is thermally expanded, this expansion can be followed with the expansion of the expansible mat member.

Particularly, when the carrier supporting mat is lapped on the outer periphery of the catalyst carrier, the sheet member or members placed between the heat insulating mat member and the expansible mat member, which constitute the carrier supporting mat, create sliding, and therefore, no tear or wrinkle occurs because the respective mat members can easily move correlatively.

Where sheet member is constituted of the material having heat insulating property, the carrier supporting mat can maintain the state that the heat insulating mat member and the expansible mat member are separated from each other. Therefore, when the recycle is needed, a smooth recycle is realized by separating the mat easily and surely.

By setting the thickness of the heat insulating mat member thicker than the thickness of the expansible mat member including the vermiculite, the thicknesses of the heat insulating mat member and the expansible mat member can be made thinner, and therefore, when lapped on the outer periphery of the catalyst carrier, the carrier supporting mat can prevent wrinkles and tears from occurring.

Where the length of the heat insulating mat member disposed on the inner side is made shorter than the length of the expansible mat member containing the vermiculite material disposed on the outer side, and where the heat insulating mat member disposed on the inner side and the expansible mat member containing the vermiculite material disposed on the outer side are positionally shifted to one another in an outer peripheral surface direction and adhered at the overlapped portion to one another by the sheet member, the catalyst carrier can be lapped without exposing the outer periphery of the catalyst carrier, so that the mat members do not positionally shift when lapped on the catalyst carrier, and so that a stable lapping state can be realized.

In addition, the outer periphery of the catalyst carrier can be lapped almost completely with the highly heat insulating mat member where the highly heat insulating mat member disposed on the catalyst carrier side and the expansible mat member disposed on the outer side are adhered to each other at an end in the longitudinal direction.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but defined claims set forth below.

What is claimed:

1. An exhaust converter comprising:

a metal casing;

a catalyst carrier disposed within the metal casing, and a multilayer structure carrier supporting mat having an inner side and an outer side wound around the catalyst carrier so that said outer side of said mat is adjacent to the metal casing and said inner side is adjacent to the catalyst carrier, said multilayer structure carrier supporting mat comprising:

a highly heat insulating mat member forming said inner side of said carrier supporting mat, an expansible mat member containing a vermiculite material forming said outer side of said carrier supporting mat, and at least one sheet member having heat resistant and lubricating properties placed between the respective mat members, wherein said mat members are slidable with respect to one another due to the lubricating properties of said sheet member when the carrier supporting mat is wound around said catalyst carrier, thereby preventing said mat members from to wrinkling or tearing during operation.

2. The exhaust converter according to claim 1, wherein the thickness of the highly heat insulating mat member is thicker than the thickness of the expansible mat member containing the vermiculite material.

3. The exhaust converter according to claim 2, wherein the length of the highly heat insulating mat member is shorter than the length of the expansible mat member containing the vermiculite material.

4. The exhaust converter according to claim 2, wherein the highly heat insulating mat member and the expansible mat member containing the vermiculite material are positionally shifted with respect to one another in an outer peripheral surface direction and adhered at the overlapped portion to one another by the sheet member.

5. The exhaust converter according to claim 2, wherein the highly heat insulating mat member and the expansible mat member containing the vermiculite material are adhered together at an end of the respective mat members in a longitudinal direction of the mat members.

6. The exhaust converter according to claim 1, wherein the length of the highly heat insulating mat member is shorter than the length of the expansible mat member containing the vermiculite material.

7. The exhaust converter according to claim 6, wherein the highly heat insulating mat member and the expansible mat member containing the vermiculite material are positionally shifted to one another in an outer peripheral surface direction and adhered at the overlapped portion to one another by the sheet member.

8. The exhaust converter according to claim 6, wherein the highly heat insulating mat member and the expansible mat member containing the vermiculite material are adhered together at an end of the respective mat members in a longitudinal direction of the mat members.

9. The exhaust converter according to claim 1, wherein the highly heat insulating mat member and the expansible mat member containing the vermiculite material are positionally shifted to one another in an outer peripheral surface direction and adhered at the overlapped portion to one another by a sheet member.

10. The exhaust converter according to claim 1, wherein the highly heat insulating mat member and the expansible mat member containing the vermiculite material are adhered at the end of the respective mat members in a longitudinal direction of the mat members.

* * * * *